US009056210B2

(12) United States Patent
White

(10) Patent No.: US 9,056,210 B2
(45) Date of Patent: Jun. 16, 2015

(54) PUBLIC BUILDING AND SCHOOL EVACUATION SYSTEM

(71) Applicant: Blair White, Charlotte, NC (US)

(72) Inventor: Blair White, Charlotte, NC (US)

( * ) Notice: Subject to any disclaimer, the term of this patent is extended or adjusted under 35 U.S.C. 154(b) by 269 days.

(21) Appl. No.: 13/855,516

(22) Filed: Apr. 2, 2013

(65) Prior Publication Data

US 2014/0291070 A1 Oct. 2, 2014

(51) Int. Cl.
*A62B 1/20* (2006.01)
*B64D 25/14* (2006.01)

(52) U.S. Cl.
CPC .. *A62B 1/20* (2013.01); *B64D 25/14* (2013.01)

(58) Field of Classification Search
CPC ....... A62B 1/20; Y10S 244/905; B64D 25/14
See application file for complete search history.

(56) References Cited

U.S. PATENT DOCUMENTS

| | | | | |
|---|---|---|---|---|
| 1,117,695 A | | 11/1914 | Novak | |
| 2,709,030 A | * | 5/1955 | Vroman et al. | 182/78 |
| 3,458,009 A | | 7/1969 | Favors | |
| 3,463,266 A | | 8/1969 | Day | |
| 3,847,246 A | * | 11/1974 | Banner | 182/78 |
| 4,049,080 A | | 9/1977 | Suzuki | |
| 4,162,717 A | * | 7/1979 | Orii et al. | 182/48 |
| 4,237,654 A | * | 12/1980 | Landem et al. | 49/141 |
| 4,434,870 A | | 3/1984 | Fisher | |
| 5,060,753 A | * | 10/1991 | Hopkins | 182/48 |
| 5,303,799 A | * | 4/1994 | Tsai | 182/78 |
| 5,467,841 A | * | 11/1995 | Krumal | 182/70 |
| 5,562,184 A | * | 10/1996 | Yung-Ho | 187/414 |
| 5,833,006 A | * | 11/1998 | McCabe et al. | 169/51 |
| 5,908,082 A | * | 6/1999 | Turner et al. | 182/18 |
| 5,975,467 A | | 11/1999 | O'Donnell et al. | |
| 6,298,970 B1 | | 10/2001 | Targiroff et al. | |
| 6,578,664 B1 | * | 6/2003 | Doherty | 182/93 |
| 6,814,183 B2 | | 11/2004 | Horvath et al. | |
| 6,877,698 B2 | | 4/2005 | Baker et al. | |
| 7,191,869 B1 | | 3/2007 | Denison | |
| 7,482,919 B1 | * | 1/2009 | Franklin | 340/506 |
| 8,162,105 B1 | * | 4/2012 | Ohland | 182/74 |
| 8,215,586 B2 | | 7/2012 | O'Donnell et al. | |
| 8,760,304 B2 | * | 6/2014 | Pincu | 340/632 |
| 2004/0060772 A1 | * | 4/2004 | Nir | 182/48 |
| 2007/0284188 A1 | * | 12/2007 | Chippindale | 182/48 |
| 2008/0223656 A1 | * | 9/2008 | John | 182/48 |
| 2011/0226550 A1 | * | 9/2011 | Tran | 182/48 |
| 2013/0213737 A1 | * | 8/2013 | Bambrick et al. | 182/18 |
| 2013/0228395 A1 | * | 9/2013 | Bell | 182/70 |

FOREIGN PATENT DOCUMENTS

| | | |
|---|---|---|
| EP | 0009379 | 2/1980 |
| EP | 0972542 | 1/2000 |
| GB | 2476929 | 7/2011 |

* cited by examiner

*Primary Examiner* — Daniel Cahn
(74) *Attorney, Agent, or Firm* — Michael I. Kroll

(57) ABSTRACT

A building evacuation system designed for the occupants of a building to escape pursuit or peril, such as fire, violence, natural catastrophe, or other emergency utilizing a deployed emergency exit incorporated into a building's exterior wall, such as a hinged latched window having an emergency exit deployment actuator mounted near the emergency exit that will simultaneously deploy an inflatable chute at the emergency exit, activate an internal audio and/or visual indicator to a central location that the emergency exit has been deployed, and initiate an automated text or voice message to the appropriate authorities, such as police and/or fire department, that the stated location's emergency exit has been deployed.

2 Claims, 10 Drawing Sheets

PUBLIC BUILDING AND SCHOOL EVACUATION SYSTEM

BACKGROUND OF THE INVENTION

1. Field of the Invention

The present invention relates generally to building safety and, more specifically, to a building evacuation system designed for the occupants of a building to escape pursuit or peril, such as fire, violence, natural catastrophe, or other emergency utilizing a deployable emergency exit incorporated into a building's exterior wall, such as a deployable hatch or window having an emergency exit deployment actuator mounted near the emergency exit that will simultaneously deploy the emergency exit, activate an internal audio and/or visual indicator to a central location that the emergency exit has been deployed, and initiate an automated text or voice message to the appropriate authorities, such as police and/or fire department, that the stated location's emergency exit has been deployed.

It should be noted that the building evacuation system of the present invention also provides for buildings having a plurality of deployable emergency exit stations and that a respective emergency exit actuator can be engaged by school aged children if need be.

2. Description of the Prior Art

While there are other building escape systems suitable for the purposes for which they were designed, they would not be as suitable for the purposes of the present invention, as hereinafter described.

It is thus desirable to provide a building emergency evacuation system providing a plurality of

SUMMARY OF THE PRESENT INVENTION

A primary object of the present invention is to provide an alternate emergency means for exiting a building other than the typical stairwell, elevator and exterior doors, which may be blocked, impassible or imperil the well being of the occupants to use.

Another object of the present invention is to provide a building with an emergency exit within a building's exterior wall having an actuator releasable hinged window.

Yet another object of the present invention is to provide at least one emergency exit for a building incorporating a chute that when deployed extends from the building's hinged window to the ground.

Still yet another object of the present invention is to provide a building emergency exit wherein said chute is contained within and deployable from a weatherproof housing.

An additional object of the present invention is to provide a building emergency exit wherein said chute's weatherproof housing is positioned approximately below the hinged window sill.

A further object of the present invention is to provide a building emergency exit wherein said chute is inflatable.

A yet further object of the present invention is to provide a building emergency exit wherein said chute is in fluid communication with a gas for inflating said chute.

A still yet further object of the present invention is to provide a building emergency exit having a breachable emergency exit actuator box having mechanical linkage for releasing said hinged window.

Another object of the present invention is to provide a building emergency exit wherein said mechanical linkage is in electrical communication with an annunciator circuit comprising audio and/or visual indicator that is energized when the mechanical linkage is engaged to release said hinged window.

Yet another object of the present invention is to provide a building emergency exit wherein said annunciator circuit further incorporates a civil authorities notification, such as police and fire department, comprising a text message or recorded message of the location and that one or more of the building's emergency exits have been deployed.

Still yet another object of the present invention is to provide a building emergency exit actuator box having a cover and tether tool that is used to breach the actuator box cover there by providing access to the mechanical linkage that will deploy the chute, release the window, energize the emergency exit actuated annunciator and transmit the civil authority notification of the deployment.

An additional object of the present invention is to provide a building emergency exit actuator box having a tethered tool for breaching the actuator box cover.

A further object of the present invention is to provide a building emergency exit that is easily deployed by an adult or child.

A yet further object of the present invention is to provide a system for escape from buildings whereby access to the window is made easier by providing fold out stairs for easier escape through said hatch.

Additional objects of the present invention will appear as the description proceeds.

The present invention overcomes the shortcomings of the prior art by providing a system for escape from public buildings and schools utilizing an inflatable slide for escape through hinged window(s) that deploys when an actuator box cover is breached providing access to mechanical linkage having a handle that when pulled inflates a chute, unlatches a hinged window, energizes a building annunciator indicating that the emergency exit has been deployed and initiates an automatic notification, either text or recorded message, sent to civil authorities, such as police and fire department, that an emergency exit has been deployed for a stated location.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

Figure 5:
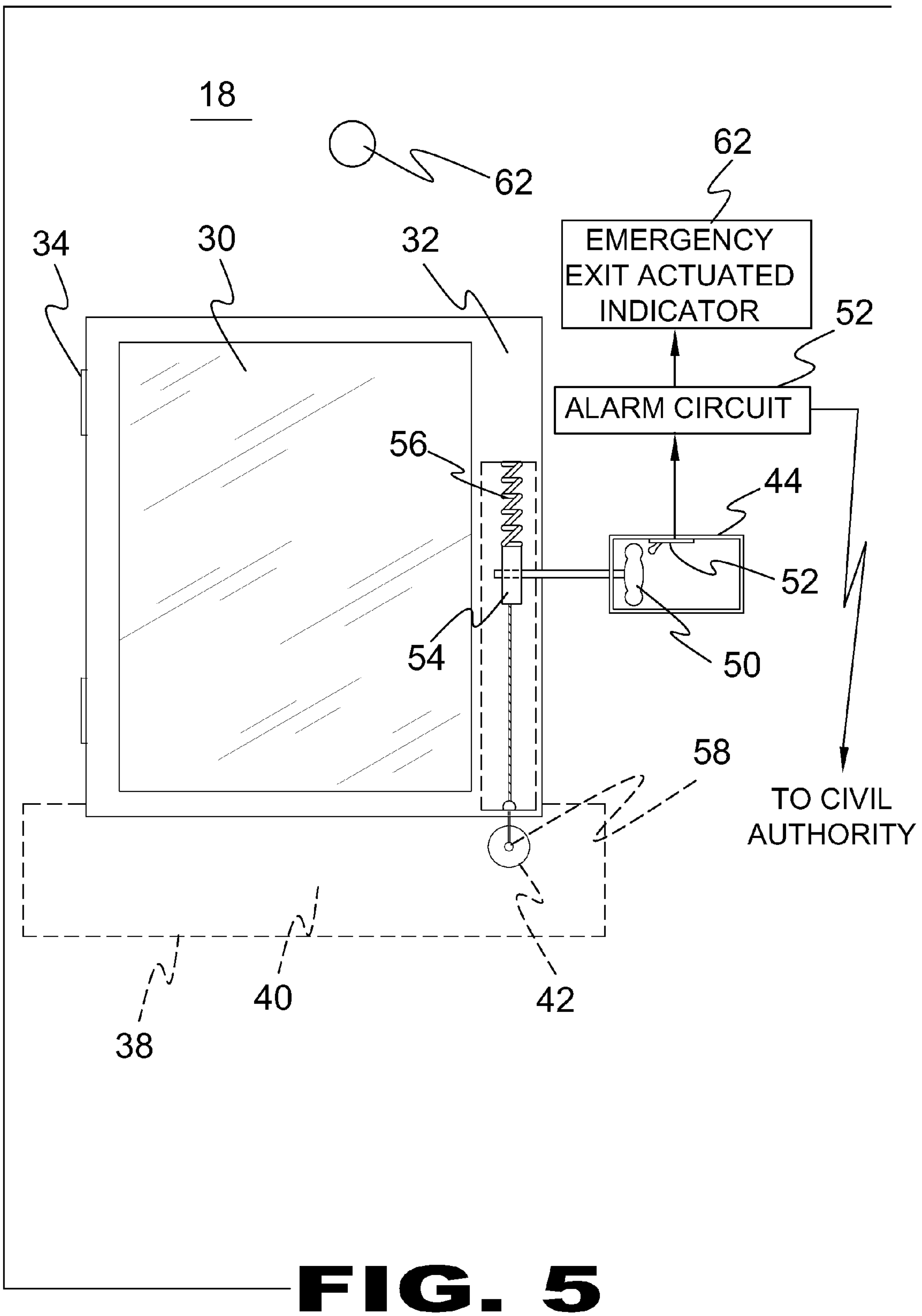

FIG. 5, shown is a perspective view of the present invention.

Figure 6:
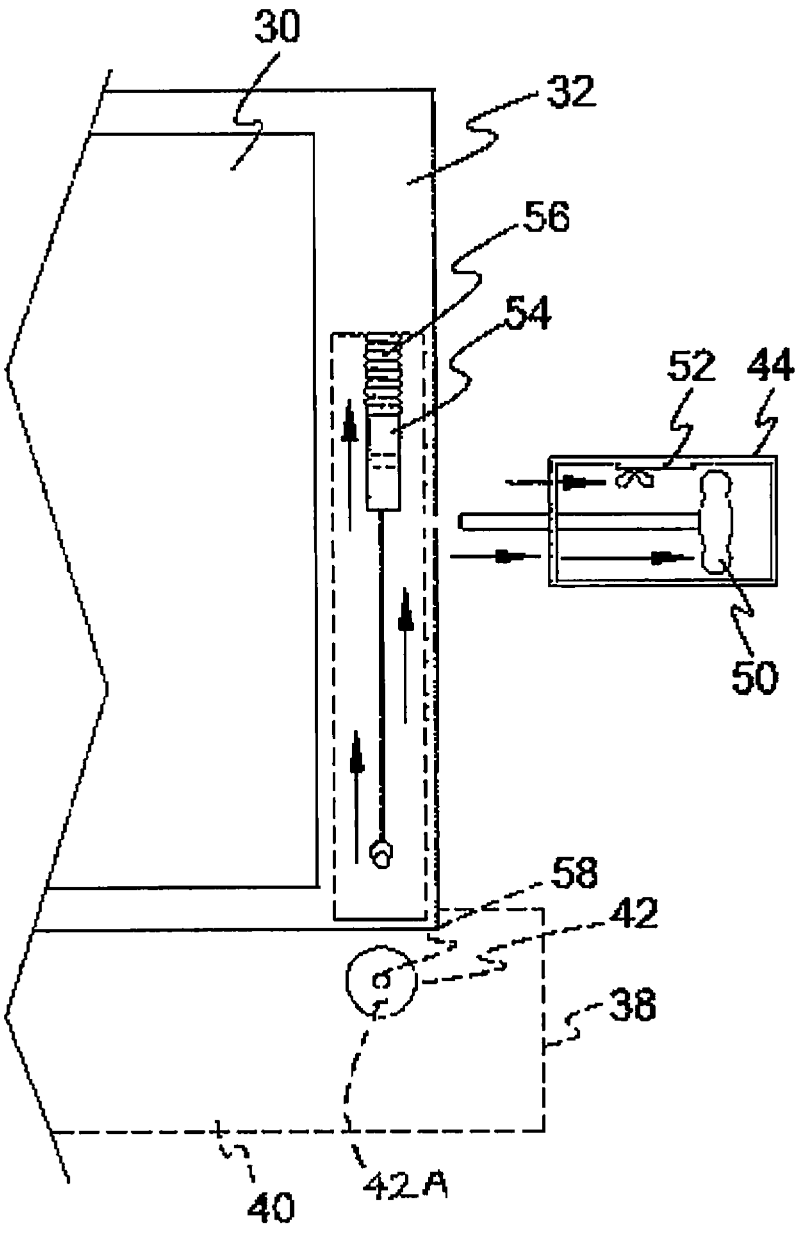

FIG. 6 is a perspective view of the exit actuator box and latched window.

Figure 7:
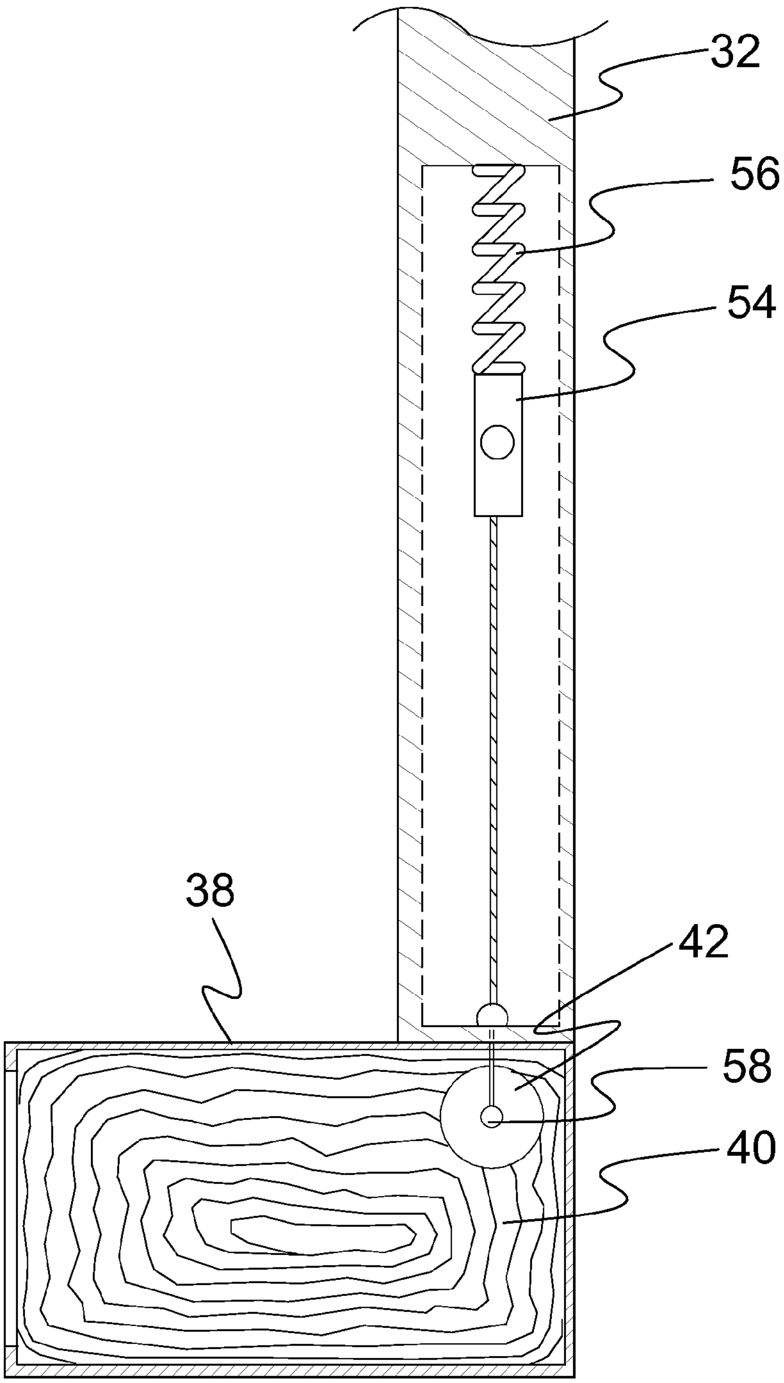

FIG. 7 is an illustrative view of the emergency exit actuator box before deployment.

Figure 8:
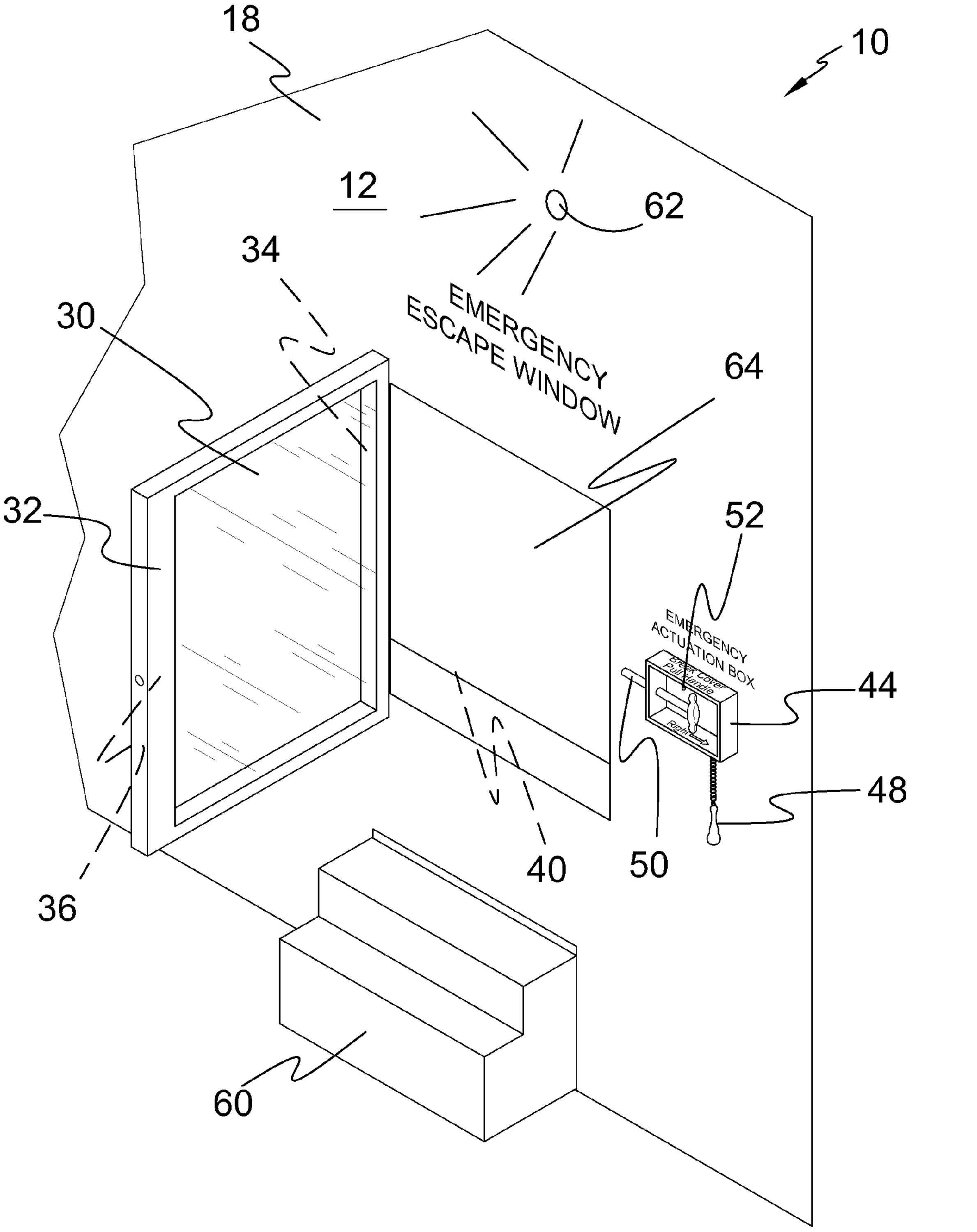

FIG. 8 is illustrative view of the means for inflating and deploying the inflatable chute of the present invention.

Figure 9:
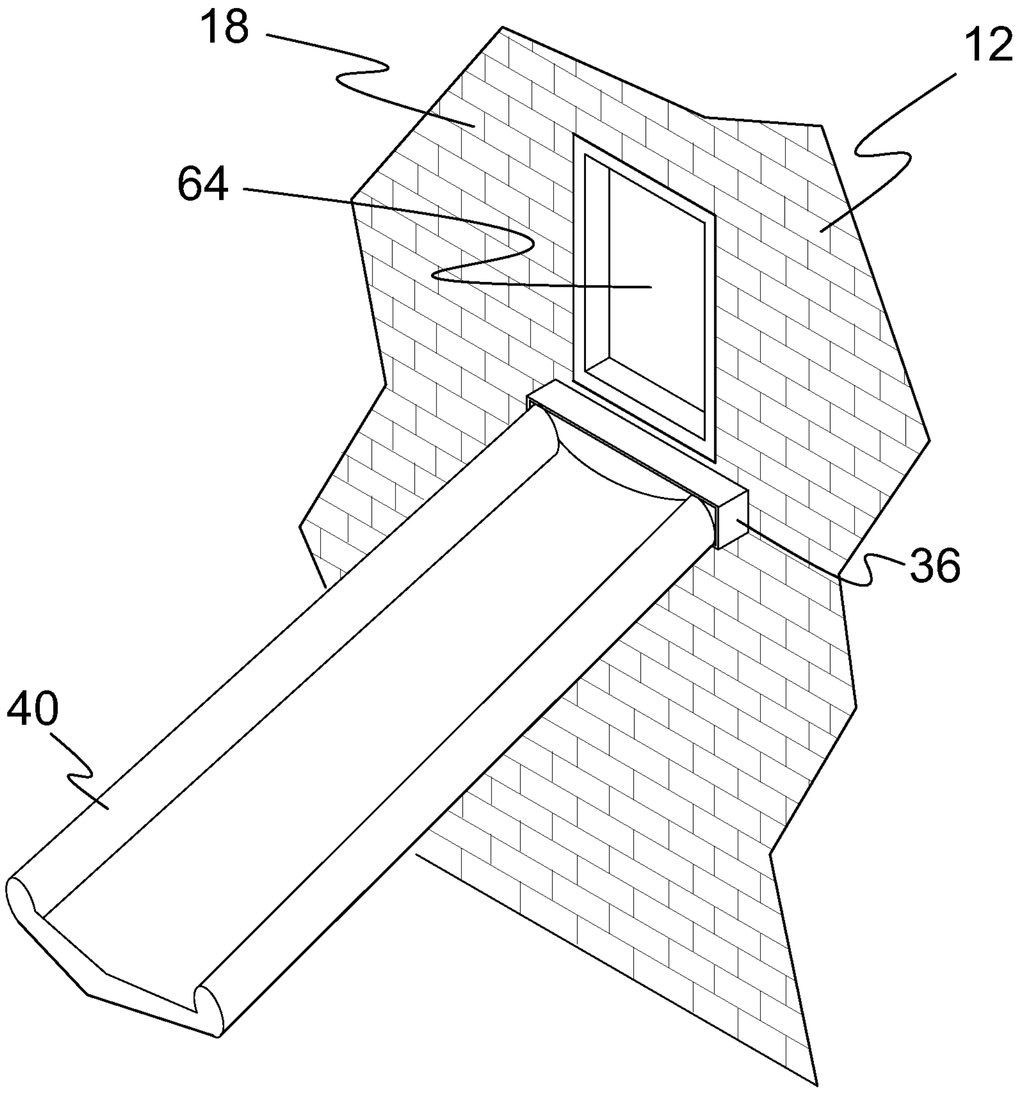

FIG. 9 is a sectional view of the present invention.

Figure 10:
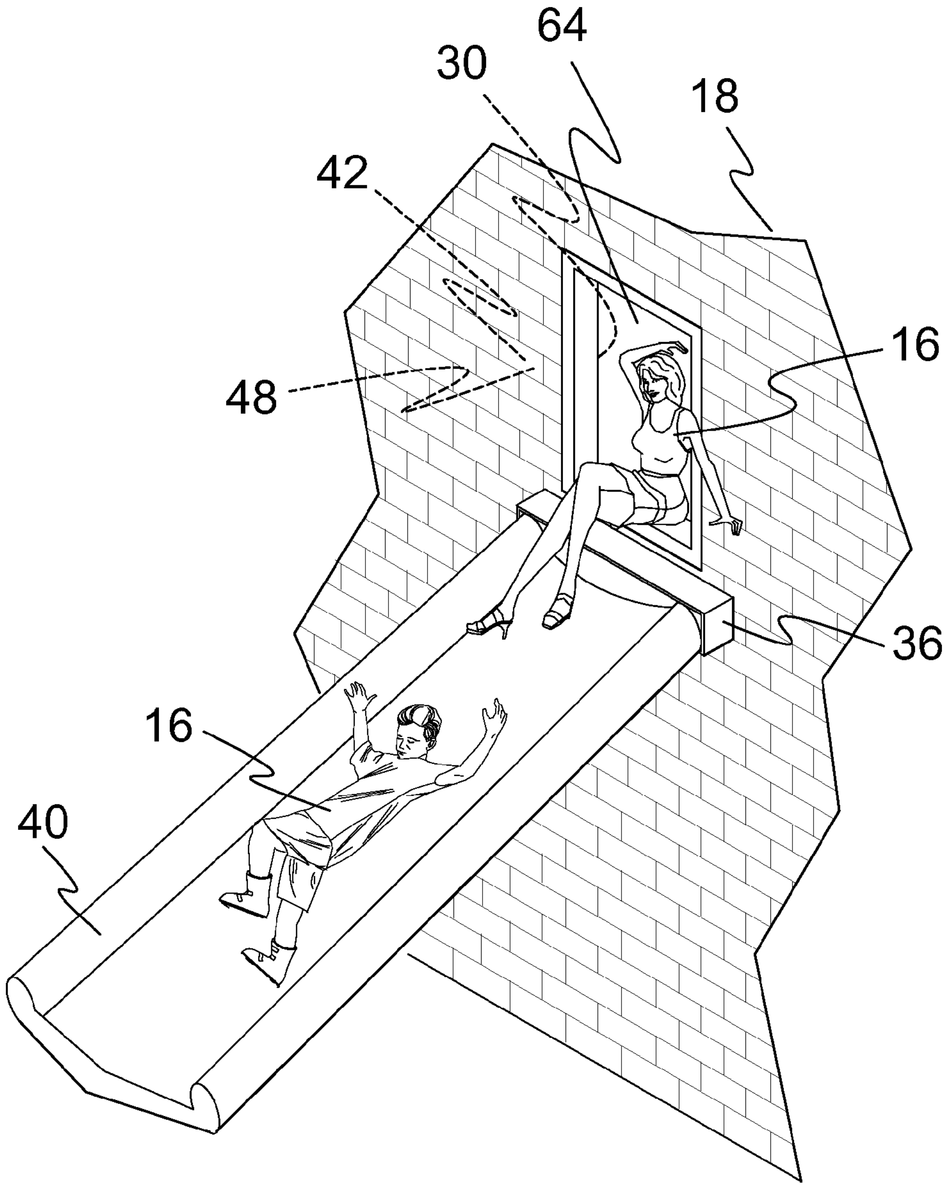

FIG. 10 is an illustrative view of the present invention.

DESCRIPTION OF THE REFERENCED NUMERALS

Turning now descriptively to the drawings, in which similar reference characters denote similar elements throughout the several views, the Figures illustrate the emergency escape system of the present invention. With regard to the reference numerals used, the following numbering is used throughout the various drawing figures.

10 emergency escape system of the present invention
12 school/public building
14 intruder
16 occupant
18 exterior wall of 10
30 window of 10
32 frame of 30
34 hinge of 30
36 latch of 30
38 chute housing
40 chute
42 propellant canister
44 emergency exit actuator housing
46 actuator housing breachable cover
48 tethered breach tool
50 emergency exit actuator
52 alarm switch
54 spring bob
56 spring
58 gas release actuator
60 steps of 18
62 emergency exit actuator indicator
64 exit portal

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
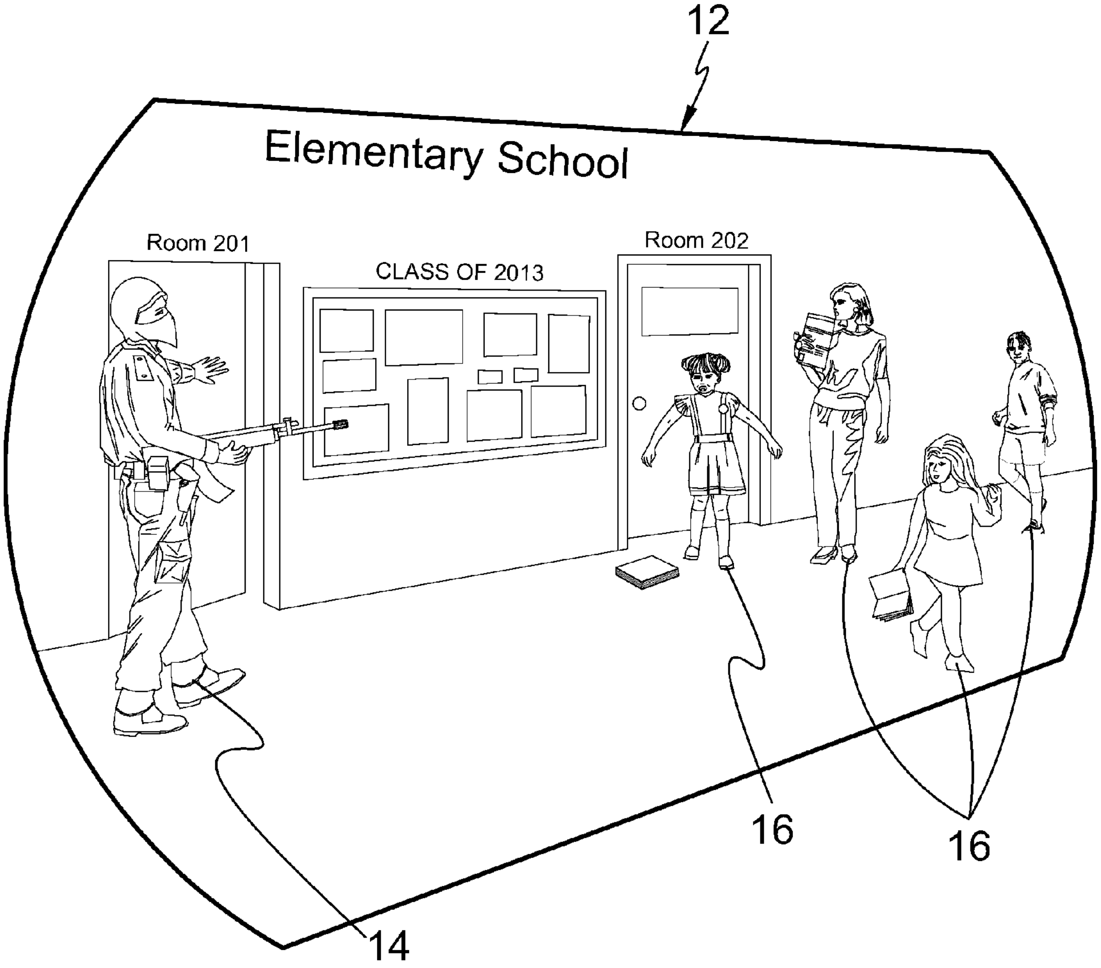
FIG. 1 is an illustrative view of prior art.

Referring to FIG. 1, shown is an illustrative view of prior art. Secure schools and public buildings 12 are vulnerable to violent intruders 14 set on melee and destruction of facilities and people's lives. This violence has become a big problem nationwide. When an intruder 14 enters a facility, the people 16 inside are basically trapped with little or no escape. The present invention over comes this problem by providing an emergency escape system by one or more inflatable chutes that preferably extend from inside an office or schoolroom having an exterior wall incorporating a breachable actuator that will release a latched portal, deploy a chute, that extends to the ground and notifies building occupants and civil authorities of the chute deployment at the specified location.

Figure 2:
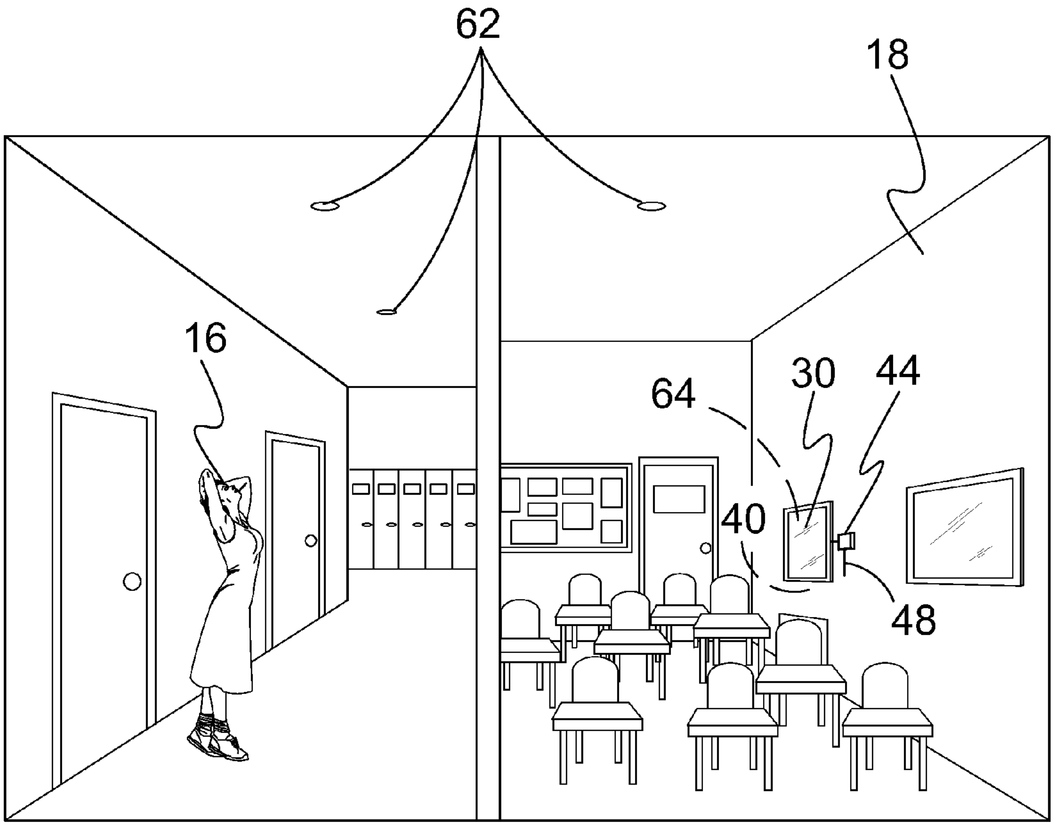
FIG. 2 is an illustrative view of the emergency building exit of the present invention in use.

Referring to FIG. 2, shown is an illustrative view of the emergency building exit of the present invention. As aforementioned, the latched hinged window 30 forms the emergency exit 64 preferably within exterior wall 18 providing access to the chute 40 that is automatically inflated from within the waterproof housing, when the emergency exit actuator housing 44 is breached using the tethered breaching tool 48 and the emergency exit actuator (shown in FIG. 3) is moved from the closed position to the open position, whereby window 30 is unlatched wherethen the chute is inflated causing deployment. Simultaneously, an alarm switch is activated when the emergency exit actuator 50 is moved to its open position energizing emergency exit actuator indicator 62 informing the building occupants that an emergency exit has been activated and telephonically transmits either wired or wirelessly to civil authorities that the emergency escape system for a stated location has been activated.

Figure 3:
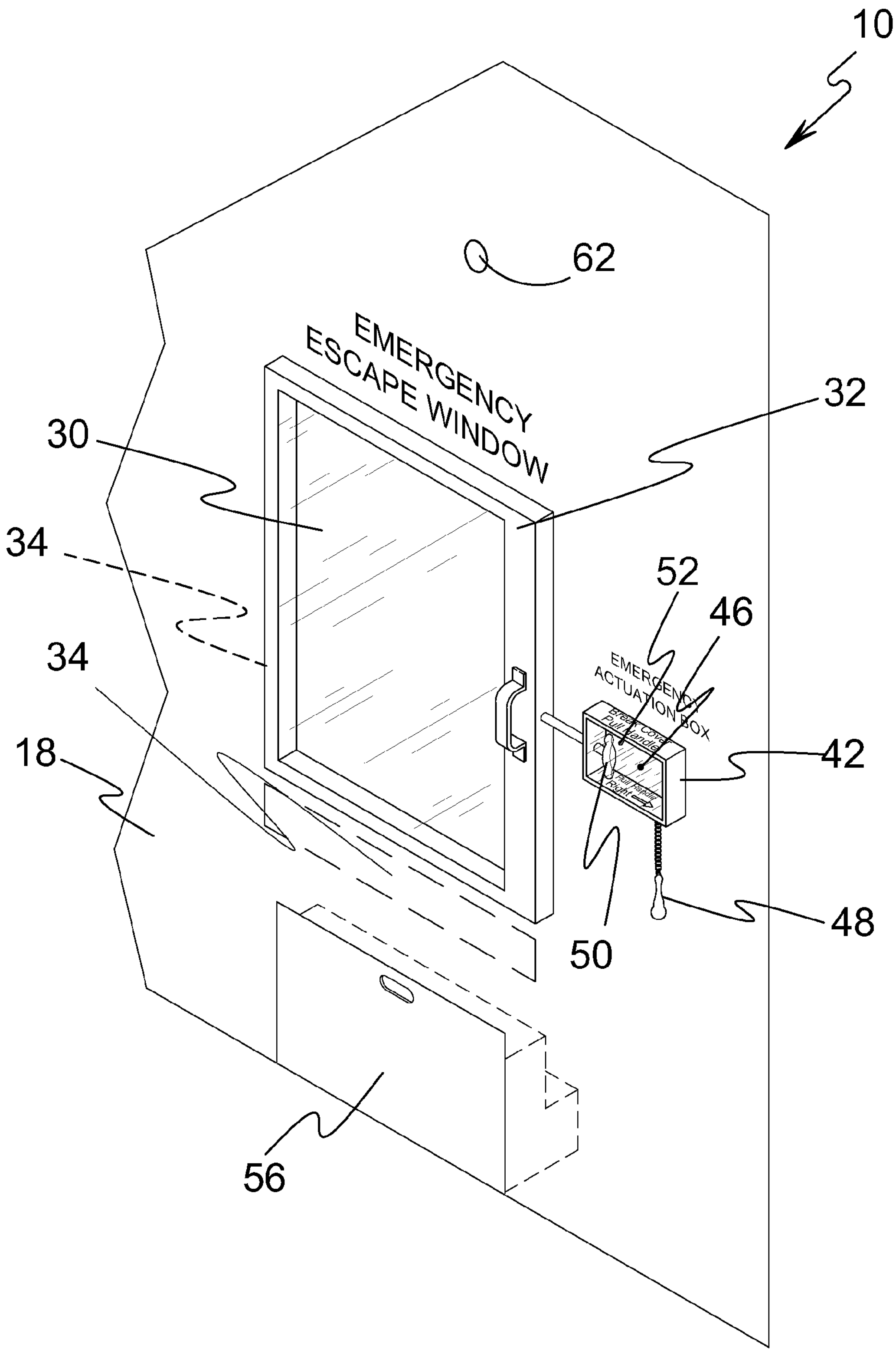
FIG. 3 is an illustrative view of the emergency building exit of the present invention.

Referring to FIG. 3, shown is a perspective view of the present invention. Shown is the emergency escape system 10 in its closed position. The window and emergency actuation housing depicted mounted on the interior side of the wall is for illustrative purposes and is not intended as the only possible mounting for the emergency exit. It is also envisioned by the present invention that the window and actuator housing may be recessed into the wall. It should be noted that the chute housing may also be embedded within the exterior wall or attached to the exterior wall. To activate the emergency exit a user breaches the actuator housing breachable cover 46 using the breach tool 48 thereby gaining access to the emergency exit actuator 50, which is in mechanical linkage with window 30 so that even if there is a power failure the emergency exit will still operate. The user moves the emergency exit actuator 50 from a closed or latched state to an open or unlatched state thereby engaging an alarm switch 52 to activate the internal building audible and/or visual alarm circuit 62 that will also notify the civil authorities. It should be noted that the present invention envisions the use of rechargeable batteries that can power the alarm circuit and telephonic communication with the civil authorities if needed. As aforementioned, the emergency exit actuator is mechanically linked to the window latching mechanism so that when the emergency exit actuator is moved to an open position it disengages from a spring bob having a mechanically linkage with a propellant canister that when disengaged inflates the chute providing means for occupants to quickly exit the building.

Figure 4:
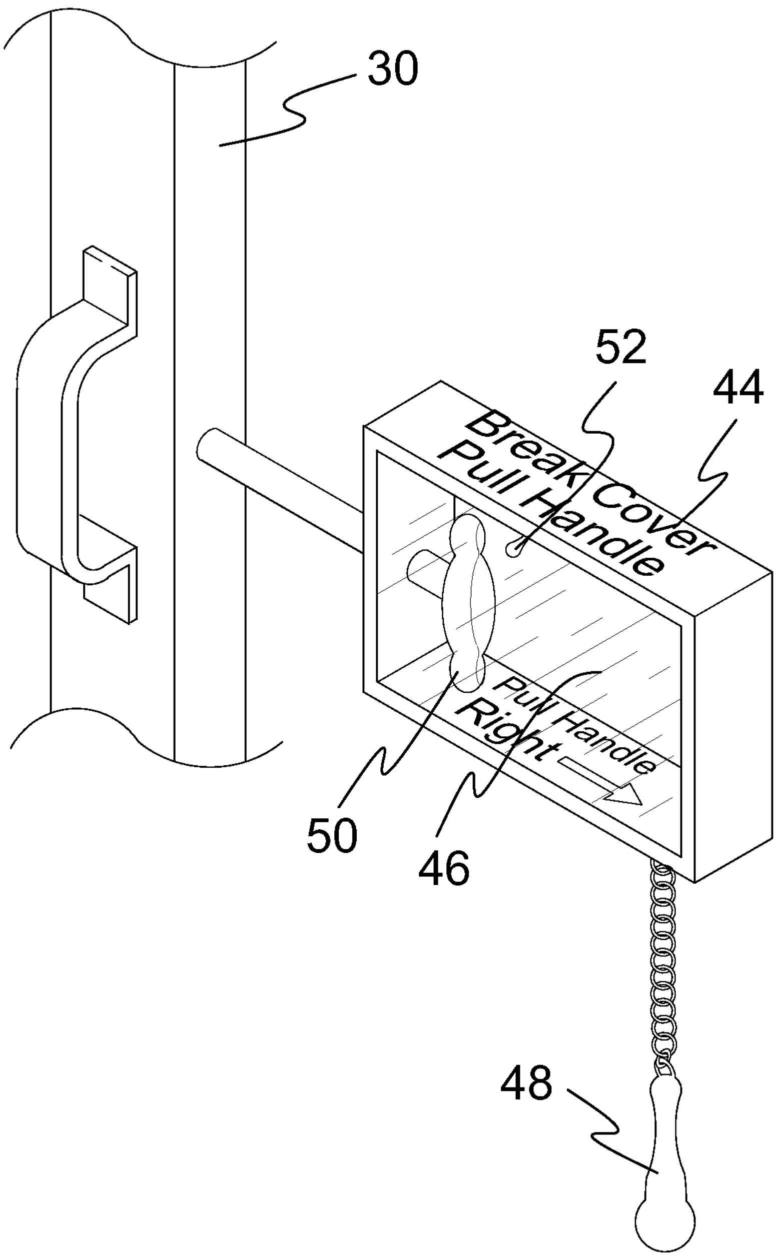
FIG. 4 is a perspective view of the present invention.

Referring to FIG. 4, shown is a perspective view of the emergency exit actuator housing and latched window. The emergency exit actuator housing 44 is a sealed unit incorporating mechanical linkage 50 for releasing a window 30 from a closed state to an open state and inflating and deploying a chute; and alarm circuit switch means 52 for informing building occupants and civil authorities that an emergency exit has been deployed for a specified location.

Referring to FIG. 5, shown is a perspective view of the emergency building exit in a closed state. The emergency escape system 10 provides means for a building's occupants to exit a building from any of a plurality of emergency escape exits incorporated into the exterior walls 18 of said building with each exit having an inflatable chute 40 that extends from a window 30 in an office or schoolroom to the ground and a wall mounted emergency exit actuator housing 44 having a breachable cover providing access to an emergency exit actuator 50 that will release the window from a latched state, inflate a chute 40 positioned under the window and energize an alarm system 52 that will audibly and/or visually 62 alert the building occupants that an emergency exit has been activated and alert civil authorities that an emergency exit for a designated location has been deployed.

Referring to FIG. 6, shown is an illustrative view of the means for inflating and deploying the inflatable chute of the present invention. Shown is the emergency escape system being deployed. Once the cover has been breached, the emergency exit actuator 50 would be moved to disengage the spring bob 54 that would rise by virtue of spring 56 thereby disengaging the spring bob linkage from propellant canister 42 opening valve 58 releasing propellant 42A thereby inflating the chute 40 with chute housing 38. The set of steps can be pivoted from within the wall 18 below the window 30 to assist people up to the window 30.

Referring to FIG. 7, shown is a sectional view of the present invention. Shown is a sectional view of the components of the emergency escape system of the present invention. By releasing the emergency exit actuator from the spring bob 54 located within the window frame 32, the spring bob 54 is lifted by the spring 56 disengaging the spring bob mechanical linkage from the gas propellant valve 58 thereby activating the inflatable chute's gas canister 64. The inflatable chute 40 within housing 38 positioned below the window 30 is deployed thereby providing an emergency exit.

Referring to FIG. 8, shown is an illustrative view of the emergency exit actuator box before deployment. The emergency escape system 10 provides means for a building's occupants to exit a building from any of a plurality of emergency escape exits incorporated into the exterior walls 18 of said building with each exit having an inflatable chute 40 that extends from a window 30 in an office or schoolroom to the ground and a wall mounted emergency exit actuator housing 44 having a breachable cover providing access to an emergency exit actuator 50 that will release the window from a latched state, inflate a chute 40 positioned under the window and energize an alarm system 52 that will audibly and/or visually 62 alert the building occupants that an emergency exit has been activated and alert civil authorities that an emergency exit for a designated location has been deployed.

Referring to FIG. 9, shown is an illustrative view of the present invention. Shown is an exterior view of the emergency escape system deployed. The emergency exit provides an escape for occupants that leads directly to the exterior building ground. The system provides a latched window that can be unlatched through breaching an emergency exit actuator housing, moving the emergency exit actuator away from the window thereby releasing the window and further disengages linkage that will cause the propellant canister to inflate the chute positioned under the window within a housing 36, which then deploys the chute 40 into engagement with the ground.

Referring to FIG. 10, shown is an illustrative view of the emergency building exit of the present invention in use. The present invention is an emergency escape system 10 for schools and buildings comprising a latched hinged window 30 forming an emergency exit 64 providing access to a chute 40 that is automatically inflated from within a waterproof housing 38 and deploys when an emergency exit actuator housing 44 is breached and the emergency exit actuator moved to an open position.

What is claimed is new and desired to be protected by Letters Patent is set forth in the appended claims:

1. An emergency escape system in a building, said emergency escape system comprises;

a) a linkage assembly having an actuator, a spring bob, a spring and a linking element, said linkage assembly configured to move from an engaged position to a disengaged position, said engaged position being when the actuator is directly connected to the spring bob, said disengaged position being when the actuator is disconnected from the spring bob;

b) a latched window hingedly attached in an exterior wall of the building, said window incorporating part of said linkage assembly, said actuator positioned proximate said latched window, said linkage assembly configured to allow the window to be unlatched and opened when said linkage assembly is moved to said disengaged position, said linkage assembly configured to prevent the window from opening when in said engaged position;

c) a housing enclosing an inflatable chute, said housing fixedly attached beneath said latched window;

d) an alarm circuit incorporating an alarm within said building, said alarm configured and arranged to notify occupants of said building that an emergency exit has been activated as a result of said actuator moving said linkage assembly to the disengaged position, and said alarm configured and arranged to transmit a telephonic communication to civil authorities that the emergency exit for a specified location has been activated as a result of said actuator moving said linkage assembly to the disengaged position; and e) said spring bob mechanically linked to a valve, said valve configured to open to release gas propellant that inflates said chute upon movement from said engaged position to said disengaged position, so that said emergency escape system is configured to inflate said chute as a result of moving the actuator which causes said linkage assembly to move to the disengaged position which causes the spring to move the spring bob which causes the linking element to open the valve and inflate said chute.

2. The emergency escape system of claim 1, wherein said chute is configured to deploy into engagement with a ground surface as a result of said gas propellant being released and inflating said chute.

* * * * *